United States Patent [19]
Abe et al.

[11] Patent Number: 5,463,206
[45] Date of Patent: Oct. 31, 1995

[54] HEATER UNIT

[75] Inventors: Fumio Abe, Handa; Tomoharu Kondo, Toki; Yuuji Deguchi, Nagoya, all of Japan

[73] Assignee: NGK Insulators, Ltd., Japan

[21] Appl. No.: 977,289

[22] Filed: Nov. 16, 1992

[30] Foreign Application Priority Data

Nov. 21, 1991 [JP] Japan .................. 3-305190

[51] Int. Cl.⁶ ............................................ H05B 3/14
[52] U.S. Cl. ............................ 219/553; 392/491
[58] Field of Search .................... 219/552, 553; 392/432, 433, 485, 490, 491, 486

[56] References Cited

U.S. PATENT DOCUMENTS

| 5,063,029 | 11/1991 | Mizuno et al. | |
| 5,140,813 | 8/1992 | Whittenberger | 60/300 |
| 5,194,719 | 3/1993 | Merkel et al. | 219/552 |
| 5,202,547 | 4/1993 | Abe et al. | 219/552 |
| 5,202,548 | 4/1993 | Kondo et al. | 219/552 |

Primary Examiner—Teresa J. Walberg
Attorney, Agent, or Firm—Parkhurst, Wendel & Rossi

[57] ABSTRACT

A heater unit includes a honeycomb heater having a resistance adjusting component and a casing for holding the heater, wherein at least part of the side of the heater is covered with protective member(s) via an inorganic adhesive and the resulting heater is held in said casing. This heater unit has a highly integral structure and can prevent short circuiting even under the severe driving conditions of automobiles and allows the resistance adjusting component (e.g. slits) to have reliable isolation from each other.

9 Claims, 11 Drawing Sheets

HEATER UNIT

BACKGROUND OF THE INVENTION AND RELATED ART STATEMENT

The present invention relates to a resistance adjusting type heater unit which can be suitably used for purification of automobile exhaust gas, etc.

Porous ceramic honeycomb structures have been known to be used as, for example, a catalyst or a catalyst carrier for conversion of nitrogen oxides ($NO_x$), carbon monoxide (CO) and hydrocarbons (HC) present in the exhaust gas emitted from the internal combustion engines of automobiles, etc. Additionally, metallic honeycomb structures have come to draw attention recently.

Meanwhile, with the stricter regulation for exhaust gas, it is desired to develop a heater or the like capable of reducing emission at cold start.

As a honeycomb structure as mentioned above, there is known, for example, a technique described in Japanese Utility Model Laid-Open No. 67609/1988. In this document there is disclosed a catalytic converter comprising (a) a ceramic main monolith catalyst and (b) an electrically heatable metal monolith catalyst provided upstream of the ceramic main monolith catalyst (a) in close vicinity thereto, consisting of a metal carrier and alumina coated thereon.

In the catalytic converter described in the document, the metal monolith catalyst as a preheater provided upstream of the ceramic main monolith catalyst in close vicinity thereto is merely a foil type metal honeycomb structure wherein electricity is passed from the inner periphery to the outer periphery for heating the structure and which has no resistance adjusting means (that is, only the material, dimension and rib thickness are specified and no resistance control is made). Therefore, there was a problem of insufficient heat-generating property.

Hence, the present applicant proposed in U.S. Pat. No. 5,063,029 a heater comprising a honeycomb structure, at least two electrodes for enabling electrical heating of the honeycomb structure, provided on the honeycomb structure, and a resistance adjusting means provided between the electrodes. In this heater, a heat-resistant inorganic adhesive of zirconia type is filled at the outer periphery of each slit to isolate the slits from each other.

This heater is capable of controlling its heat-generating property and is useful for reduction in automobile emission at cold start; however, it had a problem that the inorganic adhesive might be detached under the severe driving conditions of automobiles, particularly vibration and thermal shock.

SUMMARY OF THE INVENTION

The present invention is intended to provide a resistance adjusting type heater unit free from the above problems.

According to the present invention, there is provided a heater unit comprising a resistance adjusting type heater and a metallic casing holding the heater, the resistance adjusting type heater comprising a honeycomb structure having a large number of passages, at least two electrodes for enabling the electrical heating of the honeycomb structure, provided on the honeycomb structure, and a resistance adjusting means provided between the electrodes, in which heater unit at least part of the side of the resistance adjusting type heater is covered with protective member(s) via an inorganic adhesive and the resulting heater is held in said casing as outer frame.

In the heater unit of the present invention, at least part of the side of the resistance adjusting type heater (honeycomb heater) is covered with protective member(s) via an inorganic adhesive as if the heater is surrounded by the protective member(s). Therefore, the honeycomb heater has a highly integral structure and can be free from the deformation owing to the horizontal and vertical vibrations during automobile driving.

BRIEF DESCRIPTION OF THE DRAWINGS

FIG. 1(a) and 1(b) show a honeycomb structure, wherein

FIG. 3(a)–3(d) show a protective member, wherein

FIG. 4(a) and 4(b) show a spacer, wherein

FIG. 5(a)–5(b) show a ceramic block, wherein

FIG. 7(a) and 7(b) are views is a view showing a state in which a spacer has been inserted into a slit of a honeycomb heater, wherein

FIG. 10(a) and 10(b) show an example of the heater unit of the present invention, wherein

FIG. 12a)–12(c) show a protective member, wherein

FIG. 13(a)–13(c) show a protective member, wherein

DETAILED DESCRIPTION OF PREFERRED EMBODIMENTS

First, description is made of the method of covering a honeycomb heater with protective member(s) in the heater unit of the present invention.

In the present invention, at least part of the side of the honeycomb heater is covered with protective member(s) via an inorganic adhesive.

The part of the side of the honeycomb heater to be covered with protective member(s) is preferably made into a rough surface in order for the part to have higher adhesion to the inorganic adhesive. In order to obtain a rough surface, a known method such as sandblasting or the like can be used. A rough surface providing good adhesion is preferably obtained by applying ceramic coating (e.g. enameling) to the part to be made into a rough surface and then loading thereon a sand (inorganic abrasive grains). A rough surface is preferably obtained also by adhering to said part of the honeycomb heater side a sand (abrasive grains) of the same composition as the honeycomb structure, before the firing of the honeycomb structure, and then firing the resulting honeycomb structure (in this case, the rough surface is integrated into the honeycomb structure).

The particle diameters of the sand are preferably about 0.1–3 mm, particularly preferably 0.2–1.0 mm in view of the adhesion to the inorganic adhesive. The sand may be any material as long as it is a heat-resistant inorganic material. A ceramic-like sand such as silica sand, mullite sand, zircon sand, alumina sand, porcelain-like sand or the like, is preferable in view of its strength and heat resistance.

When enameling is applied, the glaze typically used includes, for example, A-19, A-20, A-55m, A-19H, A-417, A-520, M37 to 41, M 13 and M 43, each specified by National Bureau of Standard of U.S.A. It is preferable that the glaze and the inorganic sand be selected to that they have thermal expansion coefficients as close as possible, in view of the adhesion strength of sand, etc.

It is also possible that a metallic sand having a composition same as or similar to that of the honeycomb heater be spray-coated onto a dried honeycomb structure before firing and the resulting honeycomb structure be fired in, for example, a reducing atmosphere to obtain a honeycomb heater having metallic grains adhered onto the entire side.

Figure 2:
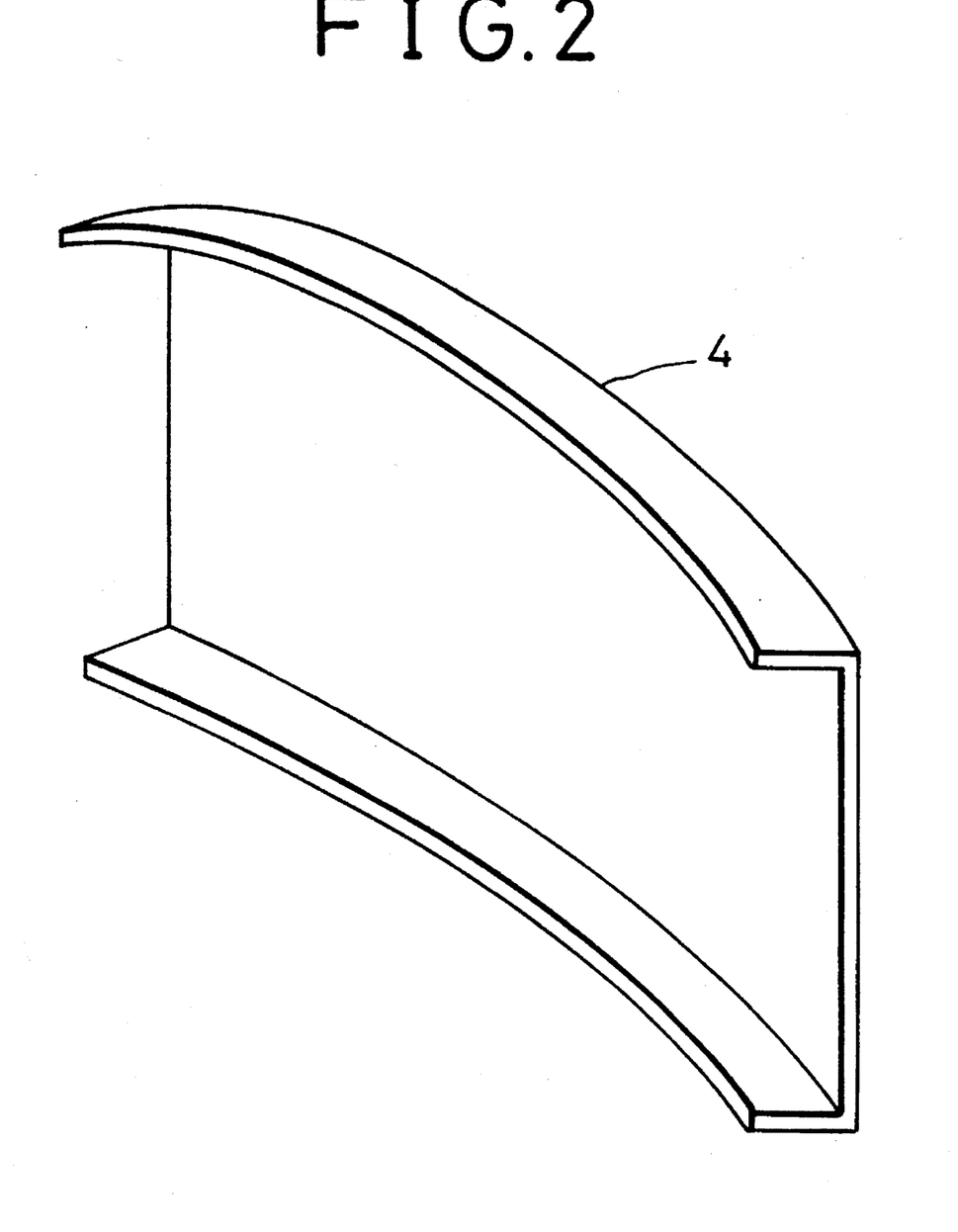
FIG. 2 is a perspective view showing a protective member.

The protective member(s) may have a sectional shape of ⊃ as shown in FIG. 2, or a simple band shape. The number of the protective member(s) depends upon the size of the heater, and may be one (in this case, one integral protective member covers the side of the heater), or two or more. Ordinarily, the number is preferably eight or less in view of the steps required for assembling.

The protective member(s) is (are) made from a heat-resistant ceramic or metal. The surface (surfaces) of the protective member(s) contacting with the inorganic adhesive is (are) preferably made rough similarly to the part of the honeycomb heater side contacting with the inorganic adhesive.

The inorganic adhesive may be any as long as it has heat resistance and insulation. There can be used, for example, a heat-resistant cement made of alumina, silica-alumina, zirconia or the like, or a phosphate type cement.

The gap between the honeycomb heater and the protective member(s), i.e., the thickness of the inorganic adhesive filled into said gap is preferably about 0.2–2 mm in view of the strength required for the heater unit and workability.

When the protective member(s) is (are) made of a metallic material, ceramic block(s) may be provided between the protective member(s) and the honeycomb heater in order to ensure the insulation between the honeycomb heater (particularly, the upper and lower ends of the side) and the protective member(s), and it is also possible to apply a ceramic coating to the part(s) of the honeycomb heater which is (are) to contact with the protective member(s), by enameling, thermal spray, CVD or the like to form an insulation film.

When the resistance adjusting means is slit(s), it is preferable to insert a ceramic spacer into each slit in order to ensure insulation between the slits.

The thus obtained honeycomb heater covered with protective member(s) via an inorganic adhesive is held in a casing by providing, between the honeycomb heater and the casing, a filler layer consisting of an inorganic fiber.

The filler layer of inorganic fiber may be made of any material. However, it preferably contains vermiculite which expands at high temperatures, in order to tightly hold the honeycomb heater and prevent gas leakage. The tightening pressure of the filler layer to the honeycomb heater is preferably 15 kg/cm$^2$ or less, more preferably 5 kg/cm$^2$ or less in view of the prevention of deformation at high temperatures. The thickness of the filler layer is preferably 7 mm or less.

When the protective member(s) is (are) made of a metallic material, the protective member(s) and the casing can be directly fixed to each other by welding or the like, whereby the honeycomb heater can be held in the casing. In this case, no filler layer is required between the protective member(s) and the casing, but it is preferable that a gap of 7 mm or less be provided between the protective member(s) and the casing. Thus, by loosely fitting the honeycomb heater to the casing, displacement of the honeycomb heater at high temperatures due to the thermal expansion can be absorbed.

The honeycomb structure, which is the main part of the present heater unit, may be made of any material as long as the material can generate heat when electrified, and may be a metal or a ceramic. However, a metal is preferable as the material for the honeycomb structure, because of its high mechanical strength. Examples of such a metal include stainless steel and those having compositions of Fe-Cr-Al, Fe-Cr, Fe-Al, Fe-Ni, W-Co and Ni-Cr. Among the above materials, Fe-Cr-Al, Fe-Cr and Fe-Al are preferred because of the low cost and high resistances to heat, oxidation and corrosion. The honeycomb structure may be porous or non-porous. However, in the case where the honeycomb structure loads thereon a catalyst, a porous honeycomb structure is preferred because it has high adhesion to the catalyst and gives rise to substantially no peeling of the catalyst caused by the difference in thermal expansion between the honeycomb structure and the catalyst.

Next, description is made on an example of the process for producing a honeycomb structure of the present invention, particularly a metallic honeycomb structure.

First, for example, some of an Fe powder, an Al powder and a Cr powder, or alternatively powders of alloys of these metals are mixed to prepare a raw material metal powder mixture having a desired composition. Subsequently, the raw material metal powder mixture is mixed with an organic binder (e.g. methyl cellulose, polyvinyl alcohol) and water, and the resulting mixture is extrusion-molded to obtain a desired honeycomb form.

Next, the shaped honeycomb body is fired in a non-oxidizing atmosphere at a temperature between 1,000° and 1,450° C. This firing is carried out preferably in a non-oxidizing atmosphere containing hydrogen, because the organic binder is decomposed and thereby removed with the aid of Fe or the like which acts as a catalyst, and consequently a good sintered body is obtained.

Firing at a temperature lower than 1,000° C. achieves no sintering. Sintering conducted at a temperature higher than 1,450° C. gives a deformed sintered body.

Preferably, the surfaces of the partition walls and pores of the thus obtained sintered body are coated with a heat-resistant metal oxide.

Next, the obtained honeycomb structure is provided, between the electrodes to be described later, with a resistance adjusting means of any form.

The resistance adjusting means provided between the electrodes of the honeycomb structure may preferably take, for example, any of the following forms:

(1) a slit or slits of any length, formed in any direction at any position, (2) variation in the length of partition walls in the axial direction of passages, (3) variation in the thickness (wall thickness) of partition walls of the honeycomb structure or variation in the cell (passage) density of the honeycomb structure, and (4) a slit or slits formed in the partition wall(s) [rib(s)] of the honeycomb structure.

Of these, the approach (1) is particularly preferable because it can easily select the heater portions to be heated and control their heat generation.

The metal honeycomb structure obtained in the manner described above is provided with electrodes, ordinarily on the outer wall or inside by means of brazing, welding or the like, whereby a honeycomb heater is produced.

Incidentally, the electrodes used herein refer to all types of terminals capable of applying power to the heater, and include terminals such as earth and the like.

The metallic honeycomb structure, when used as a heater, is preferably produced so as to have an overall resistance of 0.001–0.5 Ω.

Preferably, a catalyst is loaded on the surface of the metallic honeycomb structure because larger temperature increase by the purification reaction (e.g. oxidation reaction) of exhaust gas can be expected.

The catalyst loaded on the surface of the metallic honeycomb structure is a catalytically active substance supported on a carrier of large surface area. Typical examples of the carrier of large surface area are $\gamma$-$Al_2O_3$ type, $TiO_2$ type, $SiO_2$-$Al_2O_3$ type and perovskite type. The catalytically active substance includes, for example, noble metals such as Pt, Pd, Rh and the like, and base metals such as Cu, Ni, Cr, Co and the like. Of these, a noble metal supported on $\gamma$-$Al_2O_3$ type in an amount of 10–100 g/ft$^3$ is preferable.

Whereas the honeycomb structure employed in the present invention may have any form, it is desirable that the cell density be specifically in the range of, for example, 6 to 1,500 cells/in$^2$ (cpi$^2$) (0.9–233 cells/cm$^2$) with the wall thickness ranging from 50 to 2,000 μm.

As stated above, the honeycomb structure employed in the present invention may be porous or non-porous and may have any porosity. However, to achieve sufficient mechanical properties, oxidation resistance and corrosion resistance, the porosity of the metallic honeycomb structure is preferably held between 0 and 50% by volume with the most preferable porosity being less than 25% by volume. In a honeycomb structure having a catalyst supported thereon, the porosity is preferably held at 5% or above to ensure strong adhesion between the honeycomb structure and the catalyst.

The term "honeycomb structure" used herein refers to an integral structure having a large number of passages partitioned by walls. The passages may have any cross-sectional shape (cell shape), for example, a circular, polygonal or corrugated shape.

EXAMPLES

The present invention is hereinafter described in more detail referring to Examples. However, the present invention is by no means restricted to these Examples.

Example 1

A pure Fe powder, a pure Cr powder, an Fe-50 wt. % Al alloy powder, an Fe-20 wt. % B powder and an Fe-75 wt. % Si powder were mixed so as to give a composition of Fe-20Cr-5Al-1Si-0.05B (wt. %). To the mixture were added an organic binder (methyl cellulose), an anti-oxidant (oleic acid) and water to prepare a body. The body was subjected to extrusion to obtain a honeycomb having a section consisting of square cells. The honeycomb was dried and then fired at 1,350° C. in a $H_2$ atmosphere to obtain a honeycomb structure of 4 mil in rib thickness and 500 cpi$^2$ in number of passages.

Figure 1A:
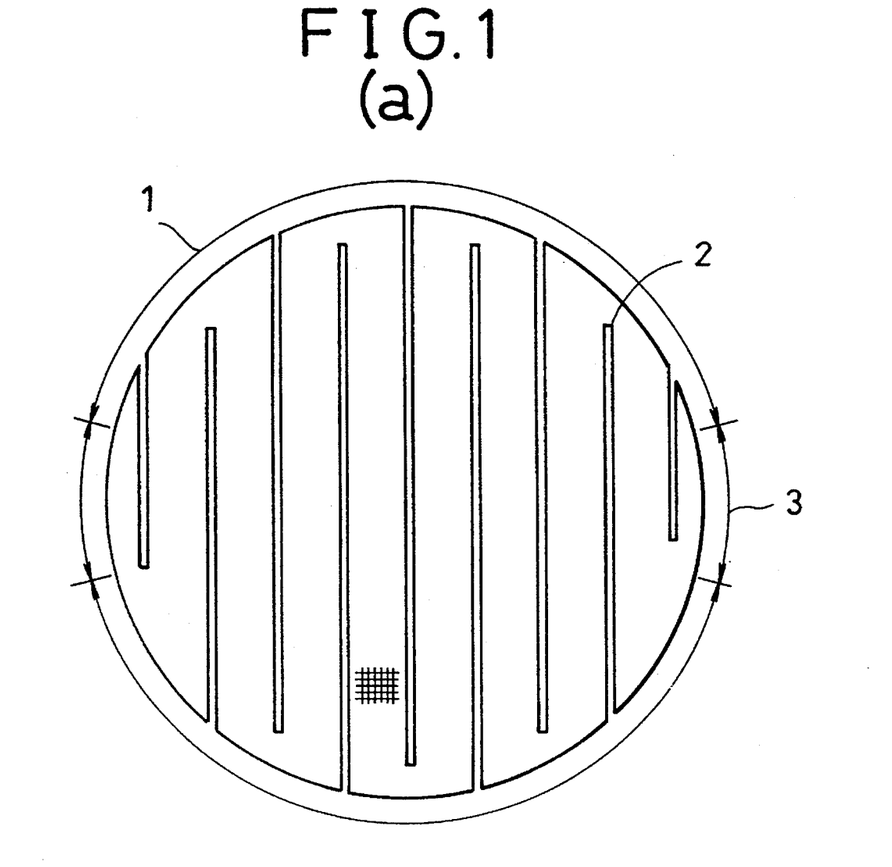
FIG. 1(a) is a plan view and FIG. 1(b) is a side view.
Figure 1B:
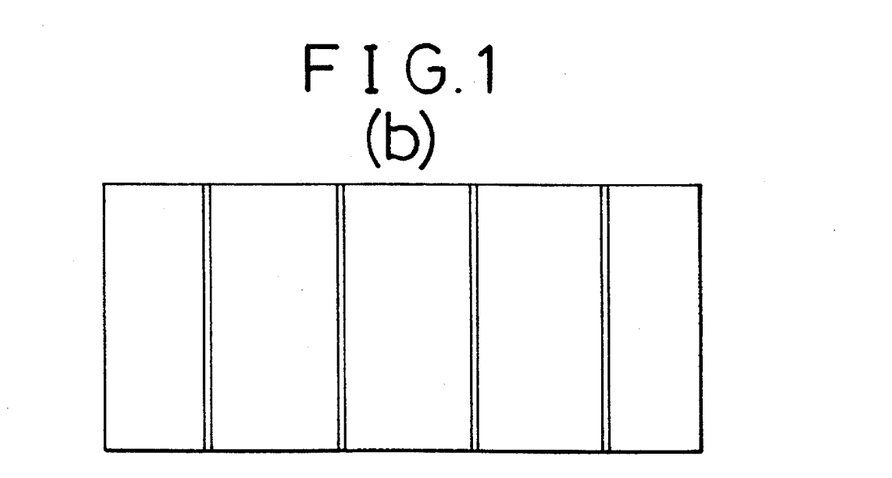

In the above honeycomb structure of 90 mm in outside diameter and 40 mm in length were formed nine slits 2 in the passage axial direction, as shown in FIG. 1(a) and 1(b). The number of cells (passages) between nearest two slits was 9 in the direction transversing them. Then, onto the central part of 30 mm in width, of the side of the resulting honeycomb structure, extending in a direction transversing the length direction of the honeycomb structure, was applied, by dipping, a slurry obtained by mixing 100 parts by weight of a heat-resistant frit (XM-981N, a product of NGK Frit) and 50 parts by weight of $Cr_2O_3$. The slurry, when made into a vitreous enamel, had a heat resistance temperature of about 740° C.

The resulting honeycomb structure was dried at 110° C. for more than 2 hours and then heat-treated at 1,150 C.° for 5 minutes in the air to form a vitreous enamel layer of 100 mm in thickness. Thereafter, the same slurry was applied again on the same part. Thereon were immediately applied $SiO_2$ particles having particle sizes of 80 mesh or less, and the same drying and heat treatment steps as above were conducted. On the same part was applied the above slurry once more (three times in total), and the same drying and heat treatment steps were conducted. Thus, there was formed, on the central part of the side of the honeycomb structure, a vitreous enamel-sand layer 1 of 30 mm in width, having a rough surface.

Figure 3A:
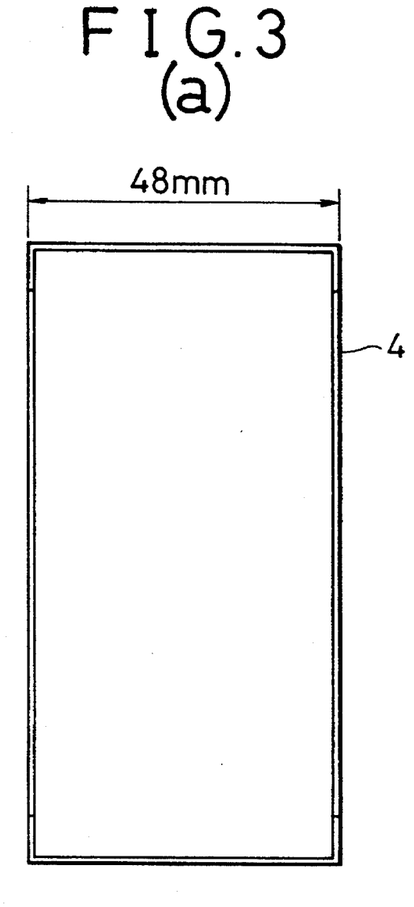
FIG. 3(a) is a plan view.
Figure 3B:
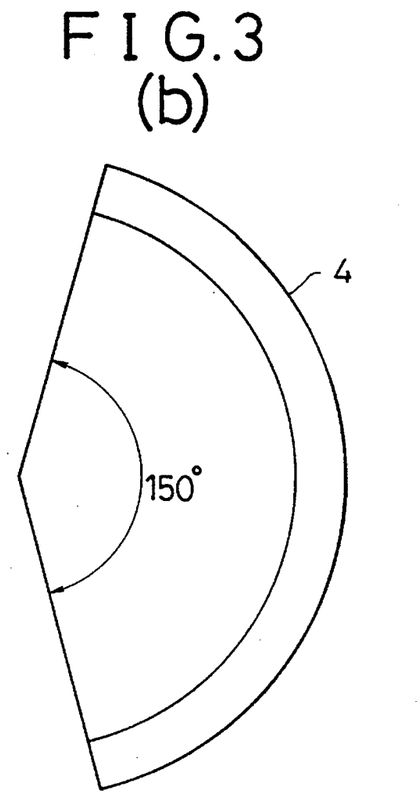
FIG. 3(b) is a side view.
Figure 3C:
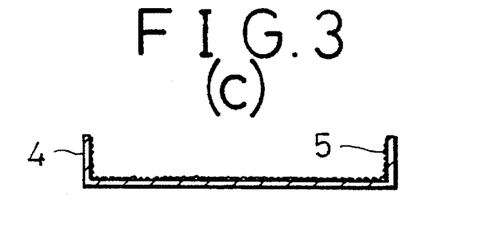
FIG. 3(c) and FIG. 3(d) are each a sectional view.
Figure 3D:
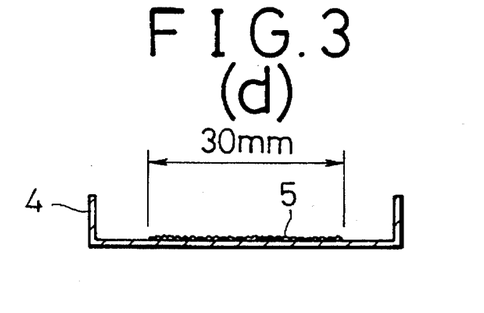
Figure 7A:
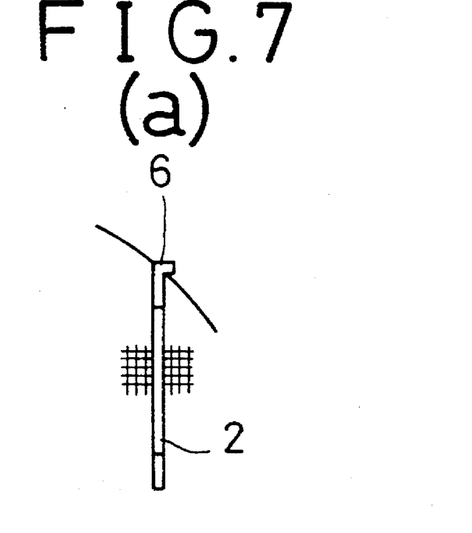
FIG. 7(a) is a partial front view and FIG. 7(b) is a partial side view.
Figure 7B:
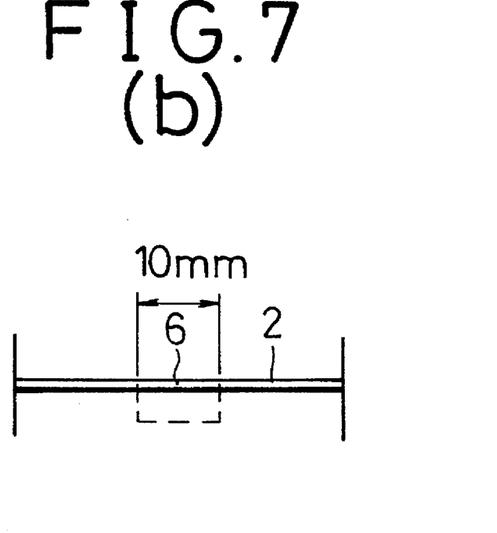

There were prepared, as protective members, two caps 4 as shown in FIG. 3(a)–3(d), made of a ferrite type stainless steel of 0.8 mm in thickness and having a sectional shape of ⊃. On the central part of the inside of each cap 4 was formed a vitreous enamel-sand layer 5 of 30 mm in width in the same procedure as used in the formation of the above vitreous-sand layer 1 on the side of the honeycomb structure, as shown in FIG. 3(d). Next, stainless steel-made M10 bolts were welded as electrodes 8 to the electrode portions 3 of the honeycomb structure, as shown in FIG. 1(a) and 1(b), and each one spacer 6 (made of $ZrO_2$) of 0.8 mm in thickness and 10 mm in width as shown in FIG. 4(a) and 4(b) was fixed at the center of each slit 2 of the honeycomb structure, as shown in FIG. 7(a) and 7(b).

Figures 4, 5:
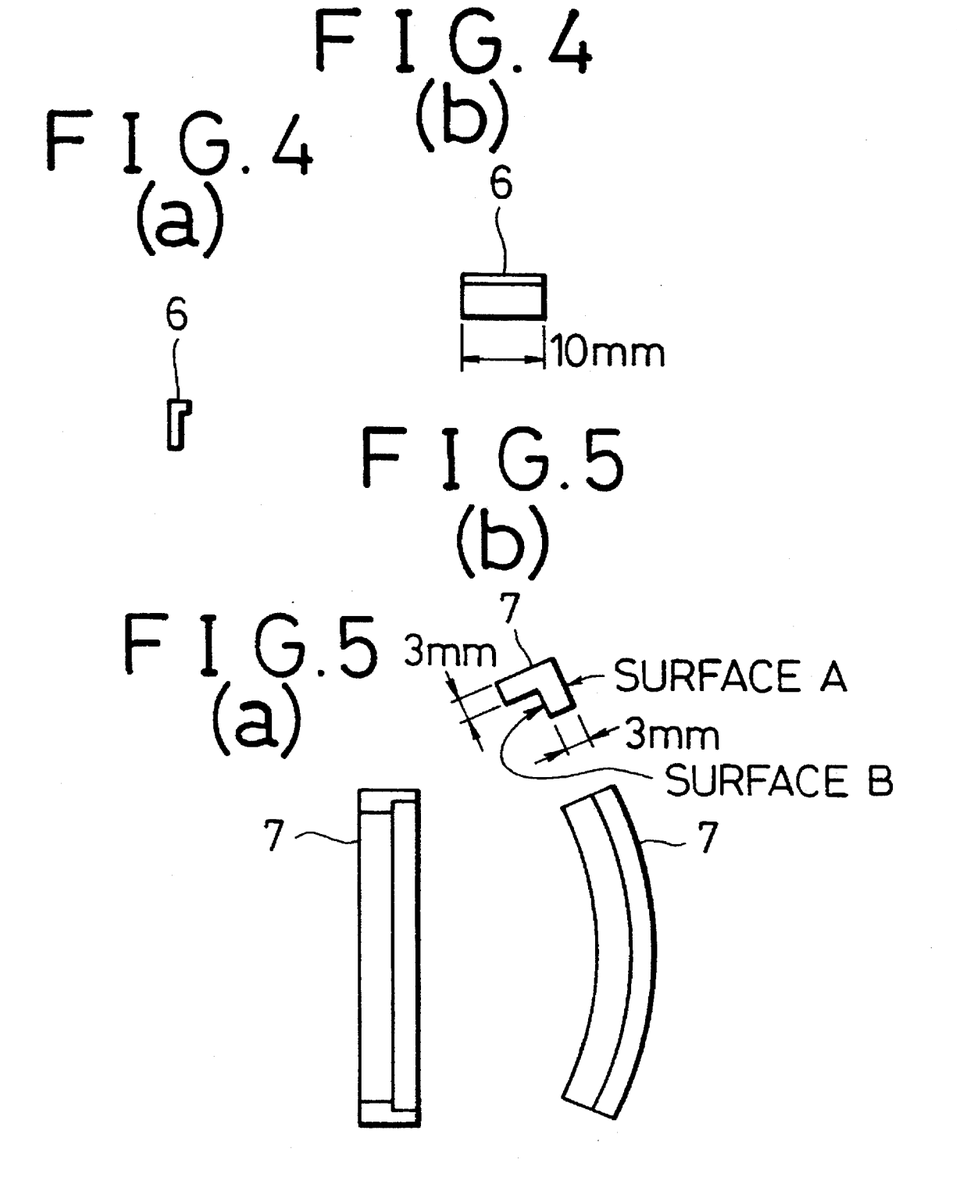
FIG. 4(a) is a plan view and FIG. 4(b) is a side view.
FIG. 5(a) is a front view.
FIG. 5(b) is a plan view.
FIG. 5(c) is a side view.

Then, there were prepared $Al_2O_3$-made ceramic blocks 7 as shown in FIG. 5(a)–5(c), having an arc shape and a L-shaped section. The surface B of each block has the same curvature as the side of the honeycomb structure and its surface A has the same curvature as the inside of each cap (protective member) 4. Three ceramic blocks 7 give the same arc as the inside of one cap (protective member) 4.

Figure 6:
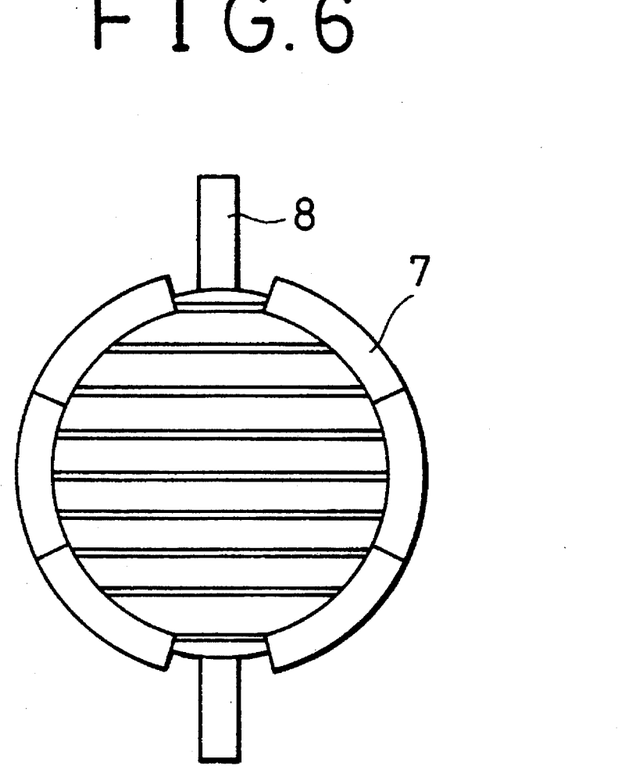
FIG. 6 is a view showing a state in which ceramic blocks have been fixed to a honeycomb heater.
Figure 9:
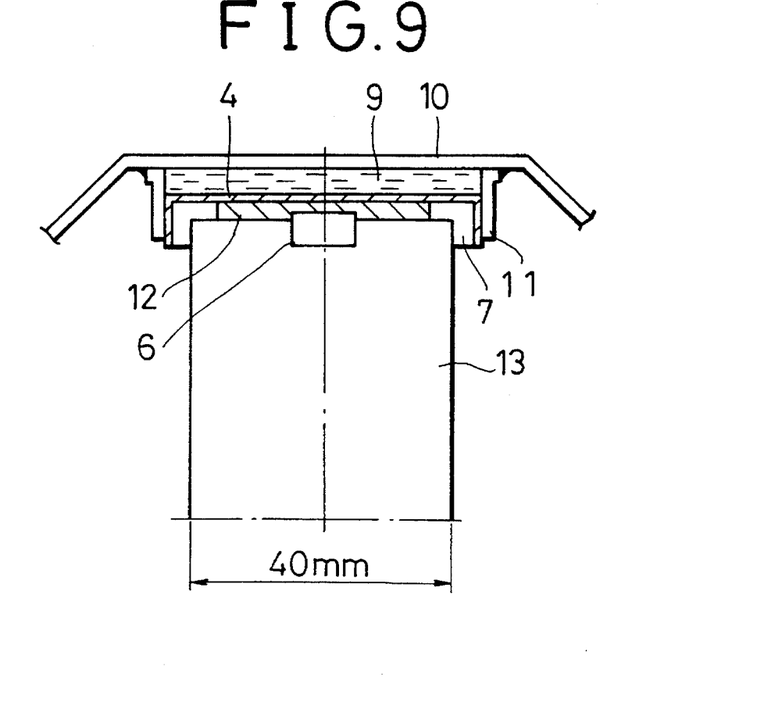
FIG. 9 is a partial sectional view showing another example of the heater unit of the present invention.

Twelve ceramic blocks were fixed to the both ends of the side of the honeycomb structure (six blocks at one end of the side and six blocks at the other end), as shown in FIG. 6. Further, as shown in FIG. 9, the caps (protective members) were fixed on an inorganic adhesive 12 filled into a space defined by the caps 4, the ceramic blocks 7 and the honeycomb structure 13. As the inorganic adhesive 12, there was used Bond X96 (a product of Nissan Chemical Industries, Ltd.). It is composed mainly of $SiO_2$ and $Al_2O_3$ and has a maximum use temperature of 1,200° C. and a thermal expansion coefficient of $8\times10^{-6}$/° C.

Figure 10:
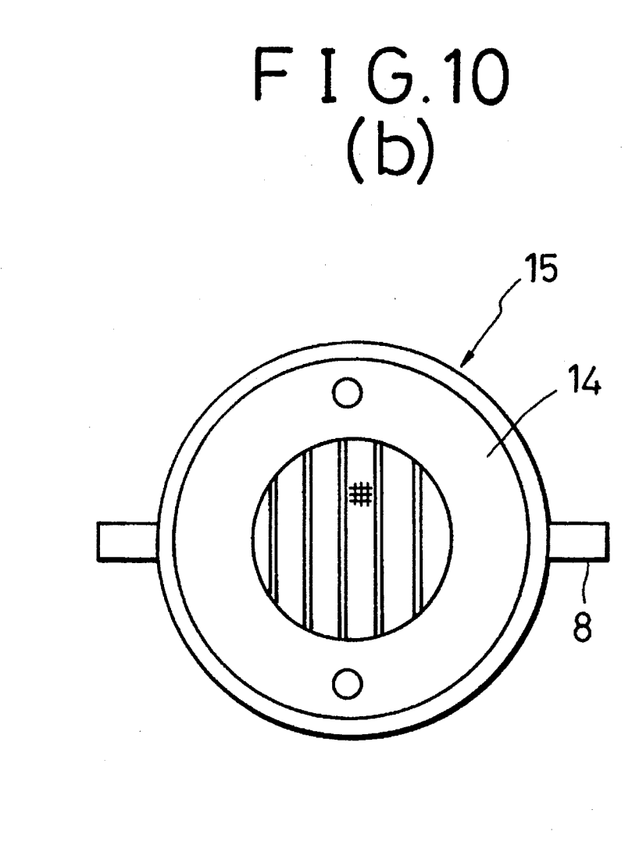
FIG. 10(a) is a side view and FIG. 10(b) is a view when FIG. 10(a) has been looked from the left side.

The resulting assembly was dried at 80° C. for 24 hours and then at 110° C. for 24 hours to obtain a honeycomb heater of 98 mm in outside diameter and 48 mm in thickness which was made integral with the caps (protective members) 4. In order to hold this honeycomb structure in a casing made of SUS 309, of 106 mm in inside diameter and 1.5 mm in thickness, as shown in FIG. 9 there was provided, between a casing 10 and the honeycomb structure 13, an filler layer 9 of inorganic fiber [Interam Mat Type 1S (trade name) manufactured by Sumitomo 3M Limited] in a thickness of 5.5 mm, and there was further provided, at the side of the honeycomb heater, two pressing rings 11 for stopping the movement of the side. The pressing rings 11 were made from the same material as the casing 10. To the casing 10 holding the honeycomb structure were fixed flanges 14, as shown in FIG. 10(a) and 10(b), to obtain a heater unit 15.

Example 2

Figure 8:
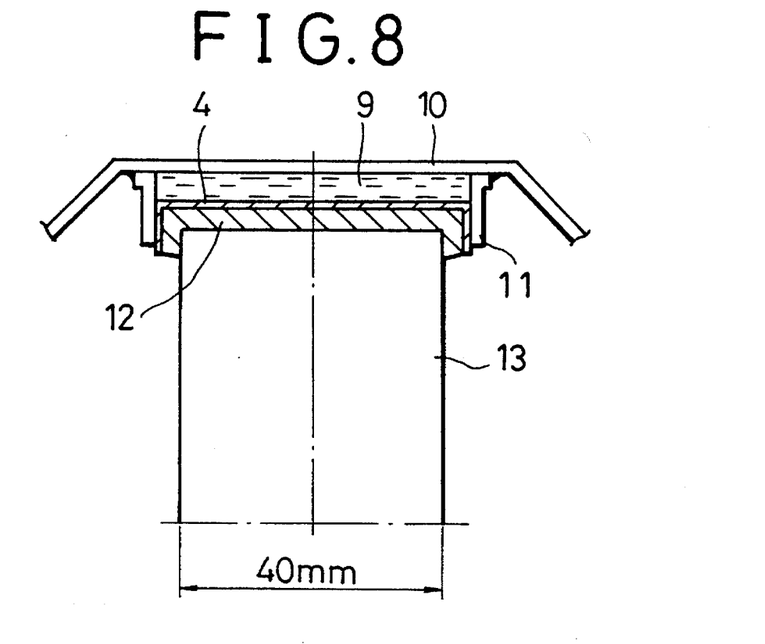
FIG. 8 is a partial sectional view showing an example of the heater unit of the present invention.

A heater unit 15 was obtained in the same manner as in Example 1 except that a vitreous enamel-sand layer 1 was formed on the entire side of a honeycomb structure, that a vitreous enamel-sand layer 5 was formed on the entire inside of each protective member, as shown in FIG. 3(c), and that an inorganic adhesive 12 was filled into the entire space between each cap (protective member) 4 and the honeycomb structure 13 without using either ceramic block or spacer, as shown in FIG. 8.

Example 3

Figure 11:
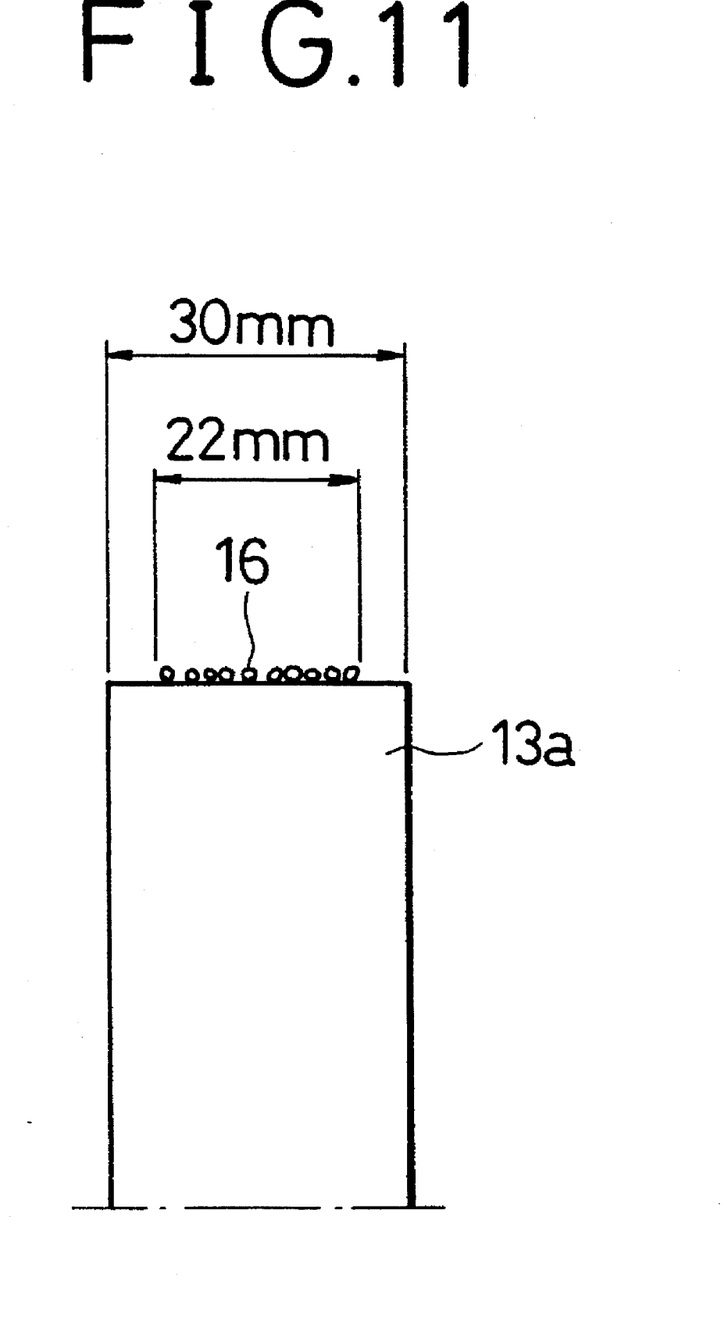
FIG. 11 is a view showing a state in which a sand is adhered to a honeycomb structure in Example 3 or 4.

A dried honeycomb material 13a of 108 mm in outside diameter and 30 mm in length, having a section consisting of hexagonal cells was obtained by preparing a body and subjecting it to extrusion in the same manner as in Example 1. Onto the central part of 22 mm in width, of the side of the dried honeycomb material 13a, extending in a direction transversing the length direction of the honeycomb material, was adhered a sand 16 of 0.5–1 mm in average particle diameter, obtained by grinding a dried material of the same composition as the dried honeycomb material 13a, with a paste obtained by dissolving the same material in water. The resulting honeycomb material was dried and then fired at 1,350° C. in a $H_2$ atmosphere to obtain a honeycomb structure 13 of 90 mm in outside diameter, 25 mm in length, 4 mil in rib thickness, 450 $cpi^2$ in number of passages and a section consisting of hexagonal cells, having, on the central part of the side extending in a direction transversing the length direction of the honeycomb structure, a sand layer of rough surface (surface roughness Rmax=0.5 to 0.8 mm) having a width of 18 mm.

In the honeycomb structure 13 were formed nine slits 2 in the passage axial direction, as shown in FIG. 1(a) and 1(b).

Figure 12A:
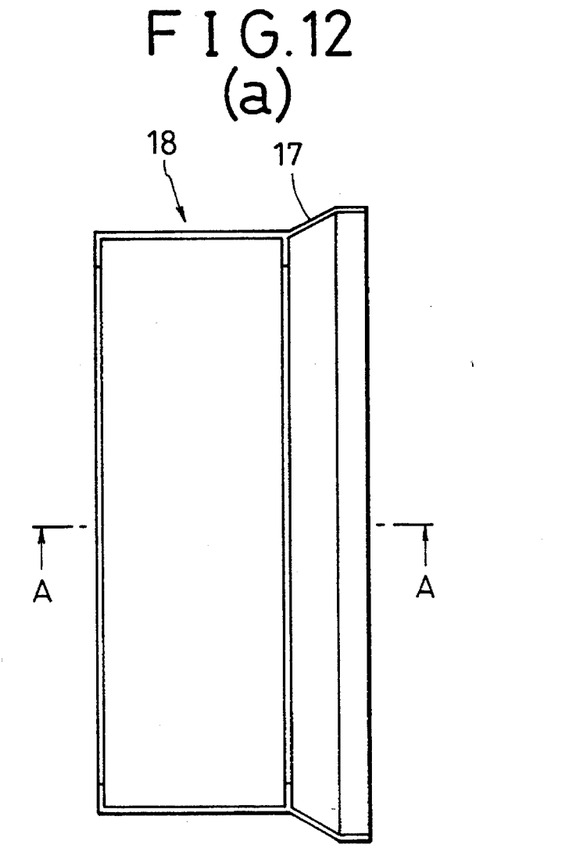
FIG. 12(a) is a plan view.
Figure 12B:
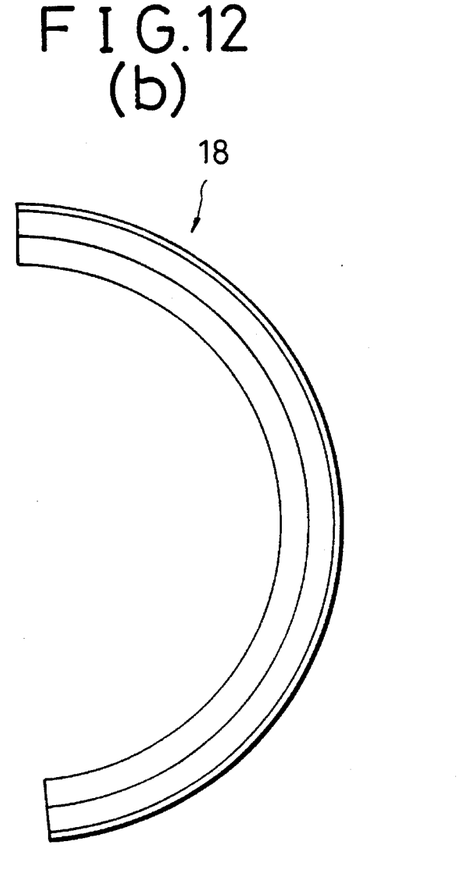
FIG. 12(b) is a side view.
Figure 12C:
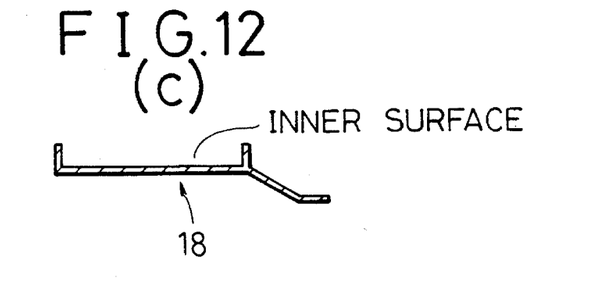
FIG. 12(c) is a sectional view taken at the A—A line of FIG. 12(a).
Figure 14:
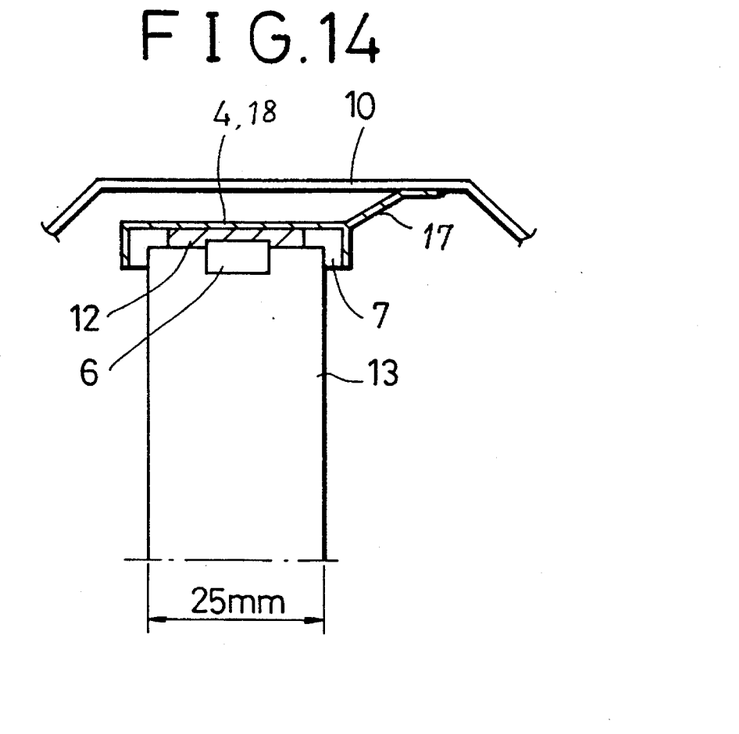
FIG. 14 is a partial sectional view showing an example of the heater unit of the present invention.

As shown in FIG. 12(a)–12(c), there were prepared, as protective members, two caps 18 made of austenite type stainless steel of 1.0 mm in thickness, each having a skirt 17 at one end [the sectional view of each protective member is shown in FIG. 12(c)]. The inner surface of the ⊃-shaped portion of each protective member was made rough by sandblasting. The subsequent procedure was the same as in Example 1 to obtain a honeycomb heater which was made integral with protective members. As shown in FIG. 14, the honeycomb heater was welded to a casing 10 at the skirt 17 of each protective member, and the subsequent procedure was the same as in Example 1 to obtain a heater unit 15.

Example 4

Figure 13A:
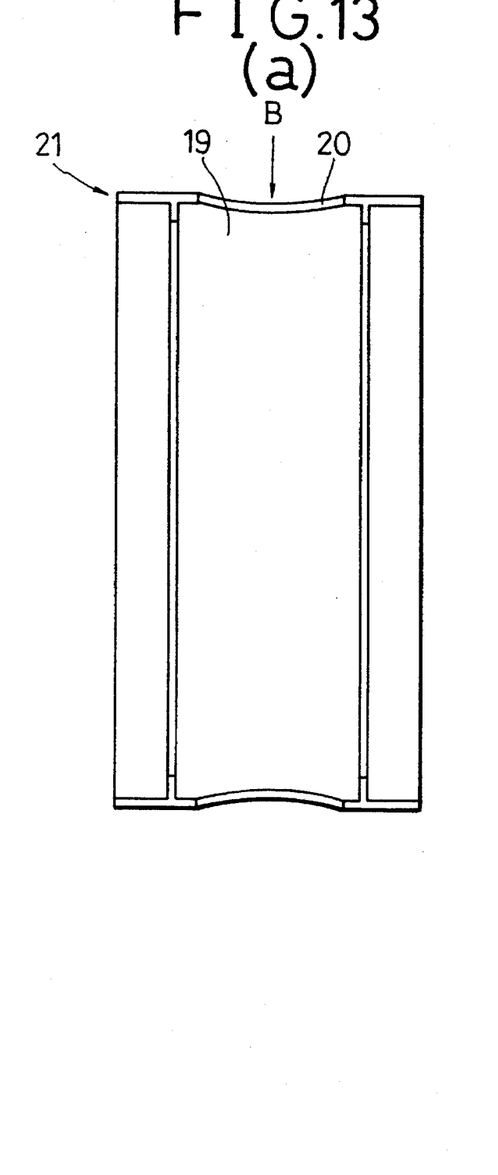
FIG. 13(a) is a plan view.
Figure 13B:
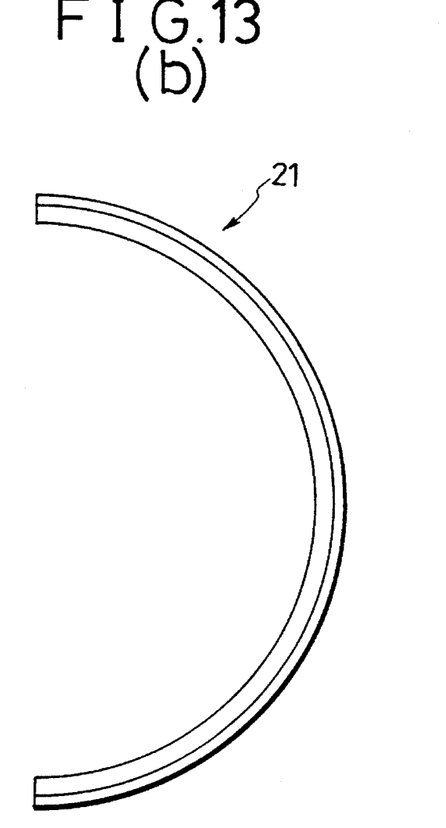
FIG. 13(b) is a side view.
Figure 13C:
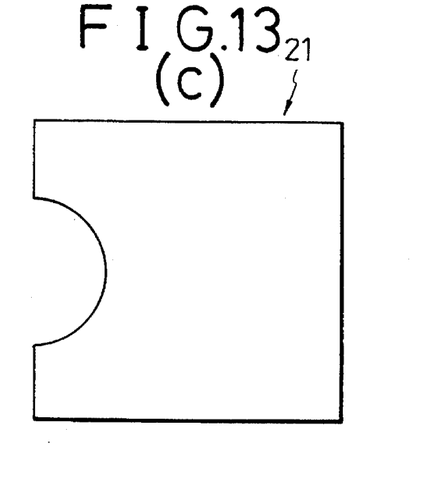
FIG. 13(c) is a view when FIG. 13(a) has been looked from a B direction.
Figure 15:
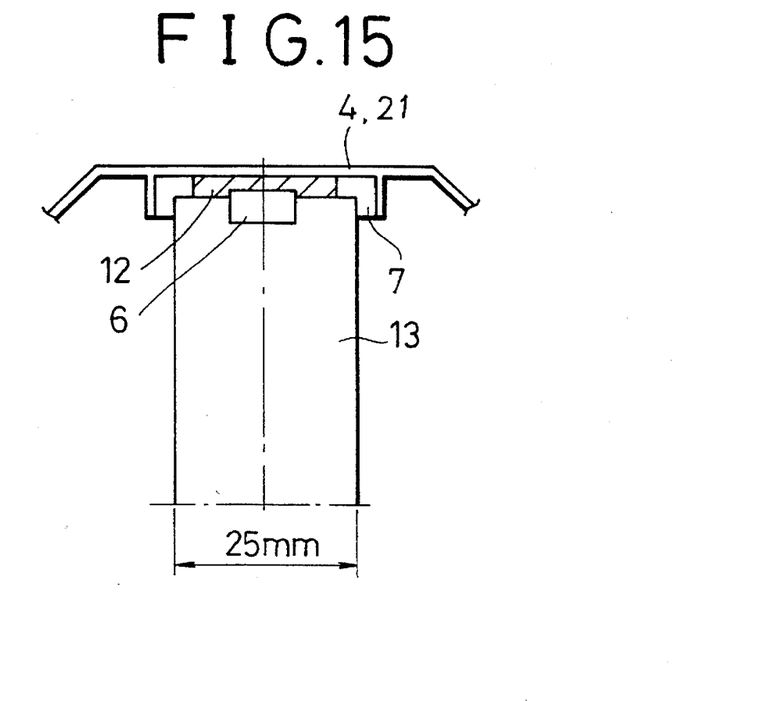
FIG. 15 is a partial sectional view showing an example of the heater unit of the present invention.

A honeycomb structure 13 was obtained in the same manner as in Example 3. Therein were formed nine slits. As shown in FIG. 13(a)–13(c), there were prepared, as protective members, two semicircular arch-shaped members 21 each made of austenite type stainless steel of 1.5 mm in thickness and having a ⊃-shaped protective portion 19 and an electrode-taking-out portion 20. The inner surface of the ⊃-shaped portion of each member was made rough by sandblasting in the same manner as in Example 3. The subsequent procedure was the same as in Example 1 to obtain a honeycomb heater which was made integral with protective members. The areas of the two protective members facing each other were welded to obtain a honeycomb heater as shown in FIG. 15, in which the protective members per se were used as a casing. The subsequent procedure was the same as in Example 1 to obtain a heater unit 15.

[Durability test by vibration and burner combustion]

The durability of the heater units obtained in Examples was examined by a durability test by vibration and burner combustion which simulated durability in actual use in automobiles.

Using a combustion gas emitted from a propane burner (amount of air intake=1 $m^3$ /min, propane=2 liters/min), each heater unit was heated from 100° C. to 800° C. for 5 minutes and then cooled from 800° C. to 100° C. in 5 minutes. This cycle was repeated 100 times (100 cycles). During the period, each heater unit was forcibly vibrated (20 G, 200 Hz) using a vibrator. The insulation of each heater unit after the test is shown in Table 1.

TABLE 1

| Appearance change of heater unit | Insulation of honeycomb structure | Resistance change of heater |
| --- | --- | --- |
| Example 1 | | |
| No change Cement scattering: none | Good | No change |
| Example 2 | | |
| No change Cement scattering: 5% | Good | No change |
| Example 3 | | |
| No change Cement scattering: none | Good | No change |
| Example 4 | | |
| Slight cell deformation Cement scattering: None | Good | No change |

As is clear from Table 1, each heater unit obtained in Examples maintained the resistance adjusting means and insulation from the casing even after the durability test, and each heater unit underwent no cell deformation.

What is claimed is:

1. A heater unit comprising:
   a resistance adjusting type heater including a honeycomb structure having an outer periphery and a large number of passages, at least two electrodes provided on the honeycomb structure to enable electrical heating of the honeycomb structure, and a resistance adjusting means provided between the electrodes;

at least one protective member covering at least part of the outer periphery of the resistance adjusting type heater, said at least one protective member being secured to said resistance adjusting type heater by an inorganic adhesive; and a metallic casing for holding the resistance adjusting type heater.

2. A heater unit according to claim 1, wherein the resistance adjusting means comprises slits.

3. A heater unit according to claim 2, further comprising a ceramic spacer inserted into each slit.

4. A heater unit according to claim 1, further comprising at least one ceramic block provided between the resistance adjusting type heater and the at least one protective member.

5. A heater unit according to claim 1, wherein the outer surface of the at least one protective member is covered with a filler layer consisting of an inorganic fiber.

6. A heater unit comprising:

a resistance adjusting type heater including a honeycomb structure having an outer periphery and a large number of passages, at least two electrodes provided on the honeycomb structure to enable electrical heating of the honeycomb structure, and a resistance adjusting means provided between the electrodes; and a metallic casing for holding the resistance adjusting type heater, said metallic casing covering at least part of the outer periphery of the resistance adjusting type heater and being secured thereto by an inorganic adhesive.

7. A heater unit according to claim 6, wherein the resistance adjusting means comprises slits.

8. A heater unit according to claim 7, further comprising a ceramic spacer inserted into each slit.

9. A heater unit according to claim 6, further comprising at least one ceramic block provided between the resistance adjusting type heater and the casing.

* * * * *